United States Patent [19]

Shimoda

[11] Patent Number: 5,588,839
[45] Date of Patent: Dec. 31, 1996

[54] INFORMATION PROCESSING APPARATUS

[75] Inventor: Isamu Shimoda, Zama, Japan

[73] Assignee: Canon Kabushiki Kaisha, Tokyo, Japan

[21] Appl. No.: 601,819

[22] Filed: Feb. 15, 1996

Related U.S. Application Data

[63] Continuation of Ser. No. 77,050, Jun. 16, 1993, abandoned.

[30] Foreign Application Priority Data

Jun. 16, 1992 [JP] Japan ..................... 4-157053

[51] Int. Cl.$^6$ .............................................. G09B 21/00
[52] U.S. Cl. .................... 434/114; 434/112; 340/825.19; 395/2.8
[58] Field of Search ............................ 434/112–116, 365; 340/825.19; 379/52; 381/51; 395/2.8

[56] References Cited

U.S. PATENT DOCUMENTS

| | | | |
|---|---|---|---|
| 3,831,296 | 8/1974 | Hagle | 434/112 |
| 4,293,855 | 10/1981 | Perkins | 340/825.19 X |
| 4,581,491 | 4/1986 | Boothroyd | 434/114 X |
| 4,651,145 | 3/1987 | Sutter | 340/825.19 X |
| 4,694,494 | 9/1987 | Woolfson | 434/112 X |
| 4,713,495 | 12/1987 | Jalava | 434/114 X |
| 4,881,900 | 11/1989 | Matsuoka et al. | 434/114 X |
| 5,186,629 | 2/1993 | Rohen | 434/112 X |
| 5,306,152 | 4/1994 | Shimoda | 434/114 |

FOREIGN PATENT DOCUMENTS

| | | |
|---|---|---|
| 0085209 | 8/1983 | European Pat. Off. . |
| 0154493 | 9/1985 | European Pat. Off. . |
| 2652933 | 4/1991 | France . |
| 0224628 | 10/1986 | Japan ........................ 434/112 |
| 2246273 | 1/1992 | United Kingdom . |
| 8606530 | 11/1986 | WIPO . |

OTHER PUBLICATIONS

The Journal of the Acoustical Society of America, "New Phone Enables the Deaf to See Messages, and the Deaf and Blind to Feel Them", Dec. 1969, U.S., pp. 1409–1410, vol. 46, No. 6(I).

Primary Examiner—Joe Cheng
Attorney, Agent, or Firm—Fitzpatrick, Cella, Harper & Scinto

[57] ABSTRACT

An information processing apparatus for physically-handicapped users includes a keyboard for inputting visual display information adapted be the visually perceived, a first display for displaying the visual information in a form so as to be visually perceived, a converter for converting the visual display information into sounds which can be understood by a visually-impaired user or into tactile display information adapted to be perceived by a hearing impaired user, and a second display for outputting the information converted by the converter as a sound or a vibration.

23 Claims, 10 Drawing Sheets

INFORMATION PROCESSING APPARATUS

This application is a continuation of application Ser. No. 08/077,050 filed Jun. 16, 1993, now abandoned.

BACKGROUND OF THE INVENTION

1. Field of the Invention

This invention relates to an information processing apparatus which can be used by the visually-handicapped and by the hearing and visually impaired, as well as by normal users.

2. Description of the Related Art

An investigation made in February, 1987 by the Ministry of Public Welfare of Japan indicates that the number of physically-handicapped people of at least 18 years old in Japan is 2.4 millions. Among them, the number of visually-handicapped people is 307,000, which corresponds to 12.7% of the total number of physically-handicapped people. Only 17,000 of these visually-handicapped people have been hired in Japan on a full-time basis. This number corresponds to only 5.5% of the total number of visually-handicapped people.

Even physically-handicapped people must deal with the new technology possessed by the current information-oriented society. We are surrounded with many kinds of information processing apparatuses, such as copiers, facsimile apparatuses, personal computers and the like. The use of such information processing apparatuses is considered to be one of the greatest handicaps possessed by a visually-handicapped person who intends to adapt himself to social life. Since tasks relating to information processing, such as the preparation of programs and the like, can be performed even at one's home, such tasks are essentially suitable for physically-handicapped people. However, various restrictions present in current information processing apparatuses hinder physically-handicapped people from fully participating in society.

FIG. 1 is a diagram showing the configuration of a conventional information processing apparatus. In the present case, a description will be provided illustrating a printer which is frequently used as a piece of peripheral equipment for a personal computer. FIGS. 2A and 2B illustrate the external appearance of the printer.

In FIG. 1, a data input device 1 receives character data from a personal computer in the form of parallel or serial data. A CENTRONIX parallel interface is most frequently used as such a device. Control device 2 converts input data into character fonts and transmits font data to an output device 3, controls the operation of the entire printer, and displays error information, such as information indicating the exhaustion of printing paper or the like, on a display output unit 5. Output device 3 prints character fonts on printing paper. Input device 4 includes switches to turn on and off a power supply, and to input commands for sheet feeding. These switches are arranged on the surface of the printer. In the external appearance of the printer shown in FIG. 2B, which shows an enlarged view of a portion of FIG. 2A, reference numerals 31, 32, 38, 34 and 35 represent an on-line switch, a line-feed switch, a page-change switch, a fine-forward-feed switch and a fine-reverse-feed switch, respectively. Since the position of each of such input units can be confirmed by touch, such units can be used even by visually-handicapped people.

Referring again to FIG. 1, display output unit 5 displays the states of the power supply, the printing paper and the like using LED's (light-emitting diodes) or the like. Such display devices are arranged on the front surface of the apparatus. In the external appearance of the printer shown in FIG. 2B, reference numerals 29, 30, 36 and 37 represent a power-supply indicator (red), an on-line indicator (red), a paper indicator (orange) and an error indicator (orange), respectively. These indicators constitute the display output unit 5 shown in FIG. 1. Since the display of these indicators depends on the functioning of the visual sense, a visually-handicapped person cannot know even whether or not they are lit, much less their color.

FIG. 3 is a diagram showing the configuration of circuitry of the above-described display output unit 5. Output terminals of control device 2 are connected to input terminals P1–P4 of display output device 5. If any one of the terminals P1–P4 assumes a high level, the polarity of the signal at that terminal is inverted by open-collector inverter circuit element (LS05) IC8 to drive the corresponding one of LED's LD1–LD4. Resistors R71–R74 are stabilizing resistors of input circuitry of the respective inverter circuit elements IC8. Resistors R75–R78 are current-limiting resistors for the respective LED's. Terminal Vcc is connected to the power-supply voltage to supply the circuit elements and LED's with power.

A visually-handicapped person may manage to perform an input operation by training his tactile sense, but cannot visually know the mode display output of a printer. One of the solutions for such a problem is "OPTACON" (a product name) which has been developed by Dr. John G. Linvill of the Stanford University in 1971 and has been marketed by the TSI Company. The name "OPTACON" stands for "Optical to tactile converter". An OPTACON device is 16 cm wide, 16 cm deep and 4.8 cm high, has a weight of 840 grams, and is portable. FIG. 4 shows the configuration of the OPTACON device. The operation of the device will be described with reference to FIG. 4.

In FIG. 4, illuminating device 41 includes a small electric lamp and a reflecting mirror (not shown). Document 43 is illuminated by illuminating light 42 from illuminating device 41. Image pickup device 44 images the image of document 43 passing through a zoom lens (not shown) onto a small silicon photodiode, named a silicon retina, which serves as an eye's retina, and converts the image into electrical signals. The optical magnification can be changed in the range of 2.5 by changing the magnification of the zoom lens. Processing device 45 extracts signals necessary to form characters and symbols from the electrical signals, and transmits the extracted signals to display device 46. Display device 46 is also termed a tactile board, and has 100 small holes in total, i.e., 5 columns of holes in the vertical direction and 20 rows of holes in the horizontal direction, each hole accommodating a pin. When an electrical signal is transmitted from processing device 45 to display device (tactile board) 46, the corresponding pins are raised from the holes and finely vibrate in a direction vertical with respect to the surface of the board.

FIG. 5 illustrates a pin arrangement of display device (tactile board) 46, comprising 5 columns of holes in the vertical direction and 7 rows of holes in the horizontal direction. A black circle indicates a state in which a pin is raised from the corresponding hole. A white circle indicates a state in which a pin is situated at its original position. By touching the pin pattern with his fingers, the user can recognize a character "η". A black circle present on the fifth row and the first column indicates noise. Such noise is produced caused by a stain, or the adherence of ink or the like on the surface of the paper. If the amount of noise is increased, tactile sensing of information becomes difficult.

In the case of a black character written on white paper, only pins corresponding to black portions are raised and vibrate to notify the user's fingers of the form of the character as it is seen. Thus, the user can know using an OPTACON device not only printed characters, but also hand-written characters, a drawing, a music note, the pattern of a material of clothes, and the like. The user can even know the display outputs of the above-described indicators of the printer.

However, the above-described conventional output method, in which information on a display output picture surface is converted into a pin pattern using an image pickup device, has the following problems.

1) The image pickup device must be pressed against the output picture surface of a visual display (for example, an (indicator), causing difficulty in its operation. Particularly when the output picture surface of a visual display, such as an indicator, has a small size, it is difficult to position the image pickup device with respect to the picture surface.

2) A change in the display output cannot be known unless the image pickup device continues to be pressed against the picture surface of a visual display, such as an indicator. For that purpose, the user must use his two hands, and so he cannot perform other operations.

SUMMARY OF THE INVENTION

The present invention has been made in consideration of the above-described problems.

It is an object of the present invention to provide an information processing apparatus which can be used by the visually-handicapped, and by the visually and hearing impaired, as well as by normal users, and in which an image pickup device need not be pressed against the output picture surface of a visual display, resulting in an easy operation and ease of use for other kinds of operations.

According to one aspect, the present invention, which achieves at least one of these objectives relates to an information processing apparatus for a physically-handicapped users. The apparatus comprises information input means for inputting visual display information adapted to be visually perceived, first display output means for displaying the visual display information in a form so as to be visually perceived, conversion means for converting the visual display information into auditory display information adapted to be auditorially perceived by a visually impaired user or into tactile display information adapted to be perceived using into tactile perception by a hearing impaired user, and second display output means for outputting the information converted by the conversion means as a sound or a vibration.

According to another aspect, the present invention which achieves at least one of these objectives relates to an electronic apparatus for processing information, comprising display means for displaying information relating to the functioning of the apparatus, and output means for outputting information displayed by the display means with a sound or a vibration.

According to another aspect, the present invention which achieves at least one of the objectives relates to an electronic apparatus for processing information, comprising display means for displaying information relating to the functioning of the apparatus, output means for outputting information displayed by the display means with a sound or a vibration, and instruction means for instructing the output means to output information displayed by the display means.

According to still another aspect, the present invention which achieves at least one of these objectives relates to an electronic apparatus for processing information, comprising generating means for generating information relating to the functioning of the apparatus, display means for displaying the information generated by the generating means, output means for outputting the information displayed by the display means with a sound or a vibration, and instruction means for instructing the output means to output the information displayed by the display means.

According to still another aspect, the present invention which achieves these at least one of objectives relates to an electronic apparatus for processing information comprising generating means for generating mode information relating to the functioning of the apparatus, display means for displaying the mode information generated by the generating means, output means for outputting the mode information displayed by the display means with a sound or a vibration, and instruction means for instructing the output means to output the mode information displayed by the display means.

These and other objects, features, and advantages of the present invention will become clear by referring to the following detailed description of the preferred embodiments together with reference to the accompanying drawings. play means for performing display relating to the function of the apparatus, and output means for outputting the contents displayed by the display means with a sound or vibration.

According to another aspect, the present invention which achieves this objective relates to an electronic apparatus having a function of processing information, comprising display means for performing display relating to the function of the apparatus, output means for outputting the contents displayed by the display means with a sound or vibration, and instruction means for making the output means output the contents displayed by the display means.

According to still another aspect, the present invention which achieves this objective relates to an electronic apparatus having a function of processing information, comprising generation means for generating information relating to the function of the apparatus, display means for displaying relating to the information generated by the generation means, output means for outputting the information displayed by the display means with a sound or vibration, and instruction means for making the output means output the contents displayed by the display means.

According to still another aspect, the present invention which achieves this objective relates to an electronic apparatus having a function of processing information, comprising generation means for generating mode information relating to the function of the apparatus, display means for displaying the mode information generated by the generation means, output means for outputting the mode information displayed by the display means with a sound or vibration, and instruction means for making the output means output the mode information displayed by the display means.

DETAILED DESCRIPTION OF THE PREFERRED EMBODIMENTS

Preferred embodiments of the present invention will now be described in detail with reference to the drawings.

First Embodiment

Figure 1:
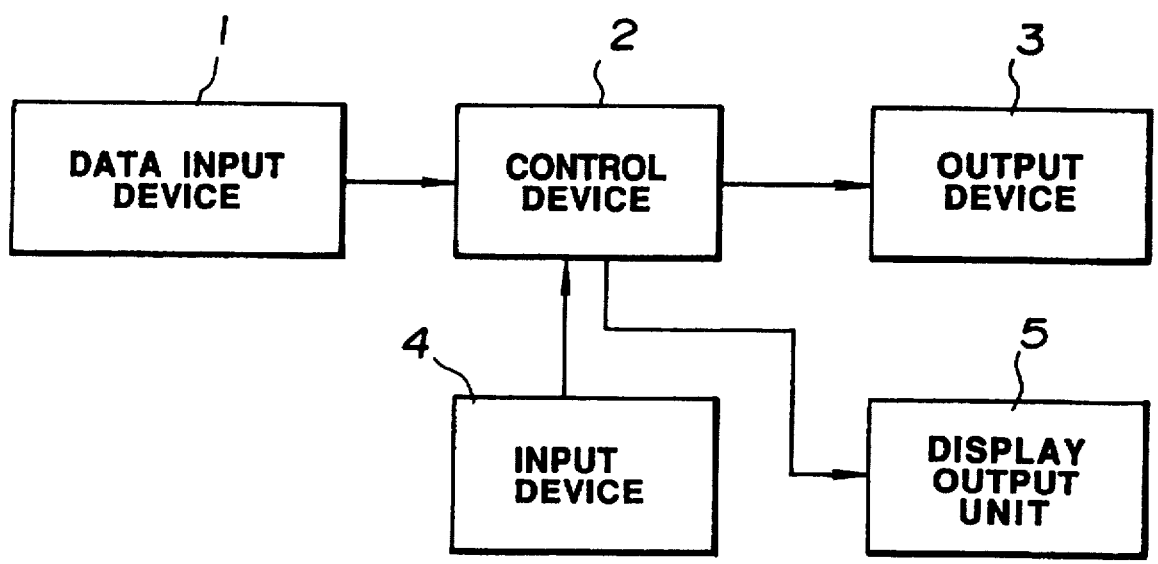
FIG. 1 is a block diagram showing the configuration of a conventional apparatus.
Figure 6:
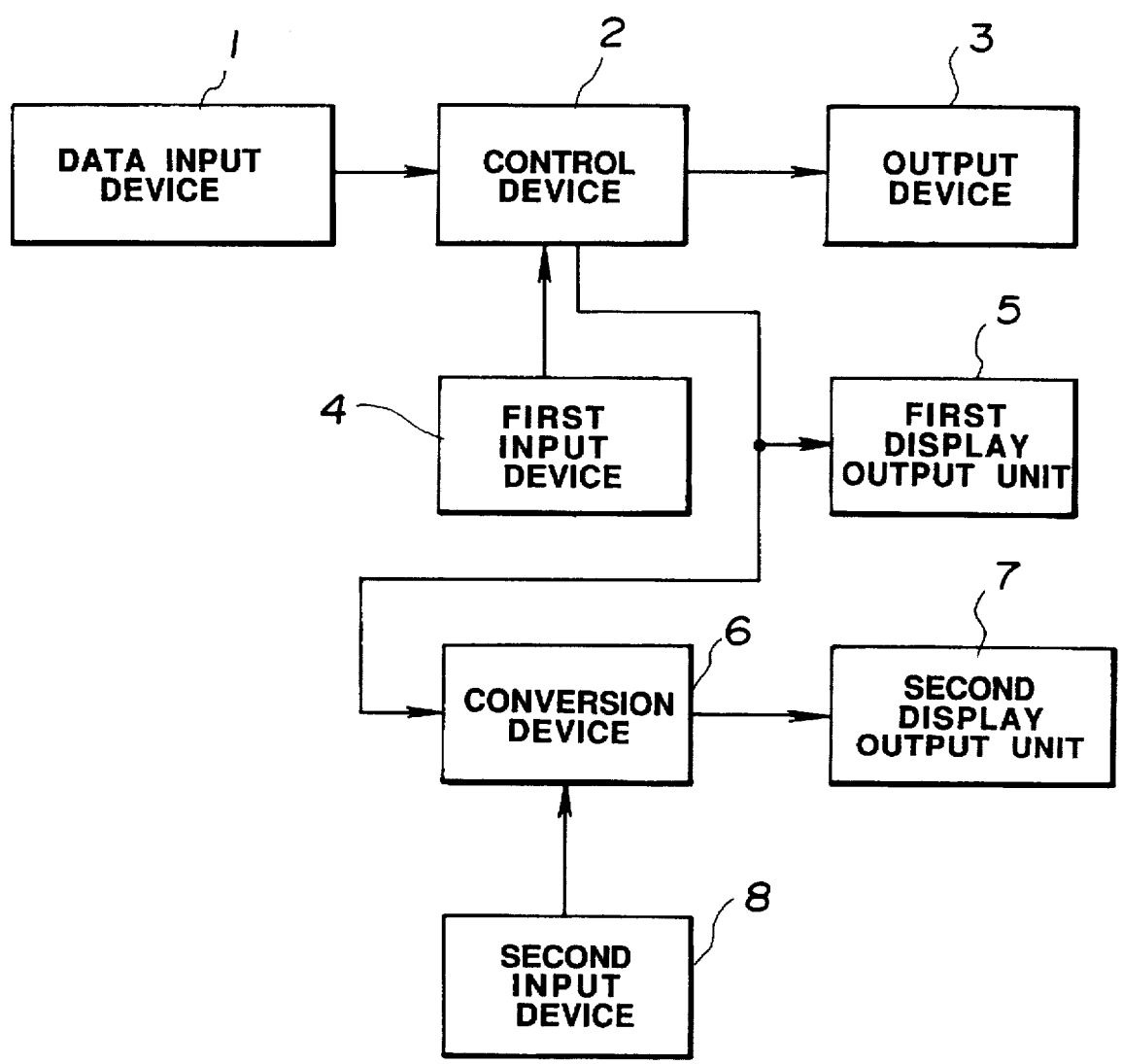
FIG. 6 is a block diagram showing the schematic configuration of the entire apparatus according to a first embodiment of the present invention.

FIG. 6 illustrates a schematic configuration of the entire printer according to a first embodiment of the present invention. In FIG. 6, the devices or units indicated by the same reference numerals as in FIG. 1 are the same devices or units having the same functions as in FIG. 1. Hence, a description thereof will be omitted. In FIG. 6, conversion device 6 converts visual display information to be transmitted to first display output unit 5 into auditory information or tactile information. Second display output unit 7 outputs information in the form of a second display output, i.e., a sound, a voice, or a vibration. Second input device 8 is used for inputting an instruction for switching when it is desired to obtain a second display output.

Figure 2A:
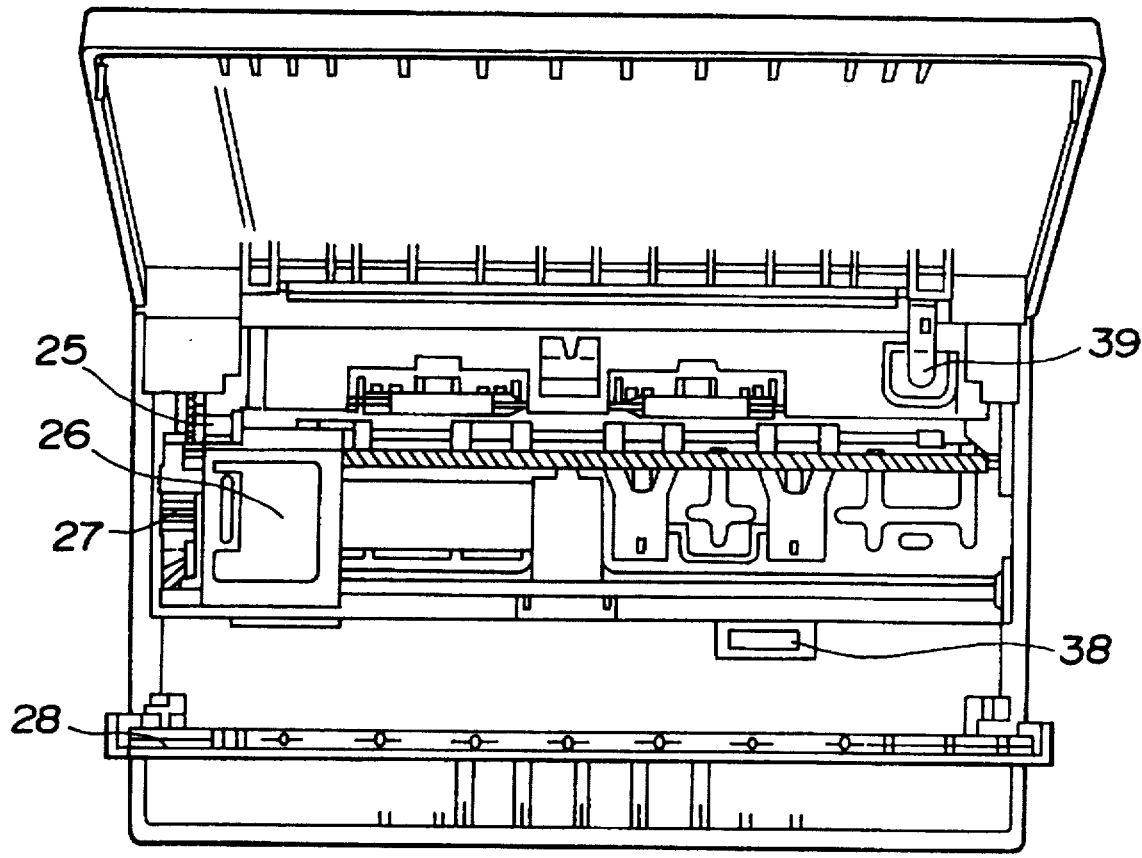
FIG. 2A is a partially-enlarged perspective view showing the external appearance of the conventional apparatus.
Figure 2B:
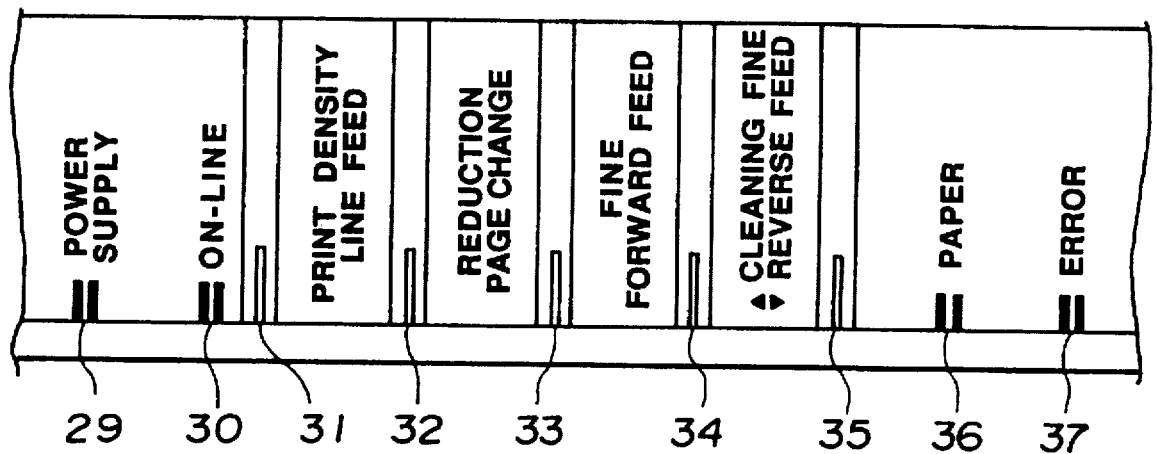
FIG. 2B is an enlarged view of a portion of the apparatus shown in FIG. 2A.
Figure 3:
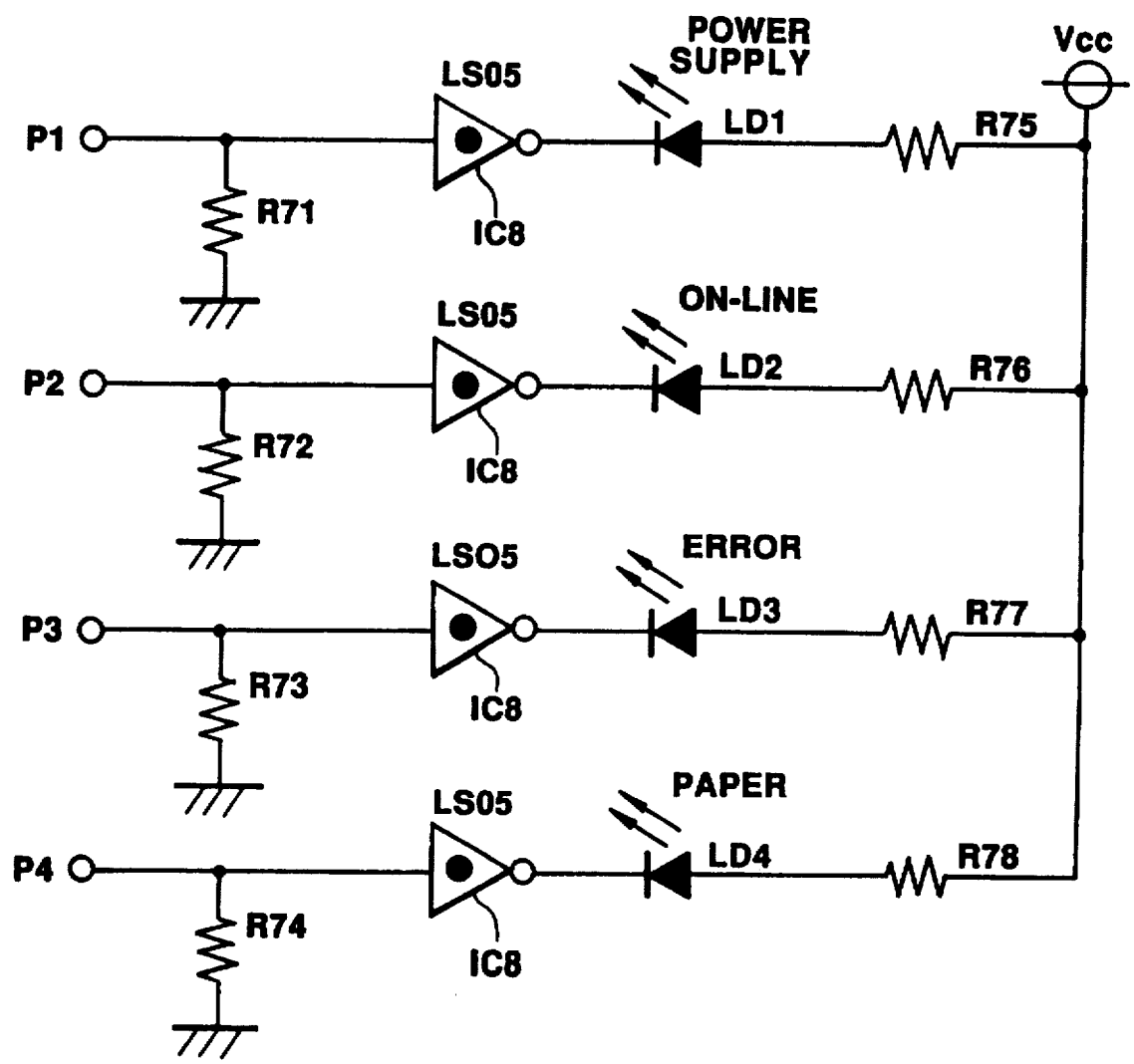
FIG. 3 is a schematic diagram showing the configuration of the circuitry of a display output unit of a conventional apparatus.
Figure 4:
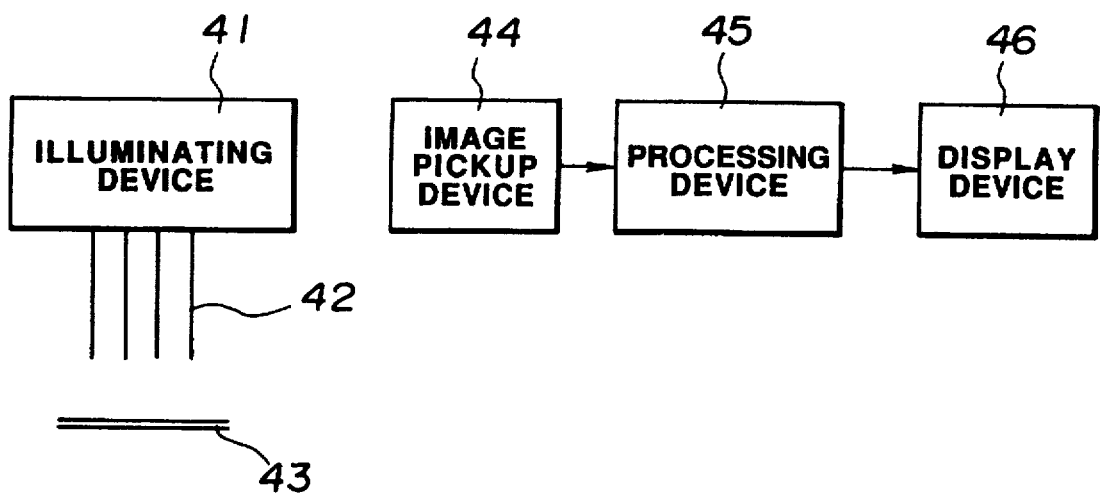
FIG. 4 is a block diagram showing the schematic configuration of a conventional reading apparatus for visually-handicapped users.
Figure 5:
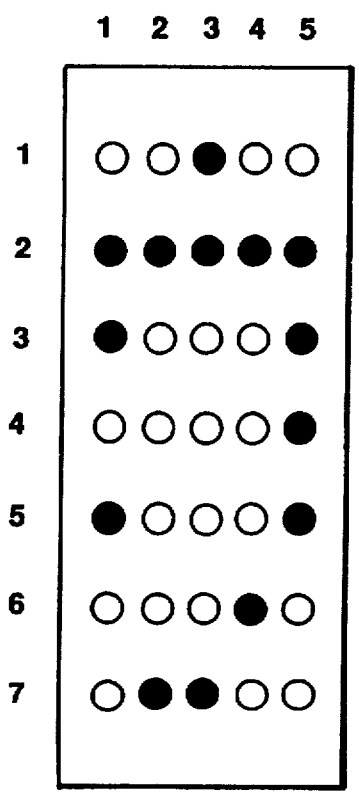
FIG. 5 is a plan view showing a pin pattern on the display unit shown in FIG. 4.
Figure 7:
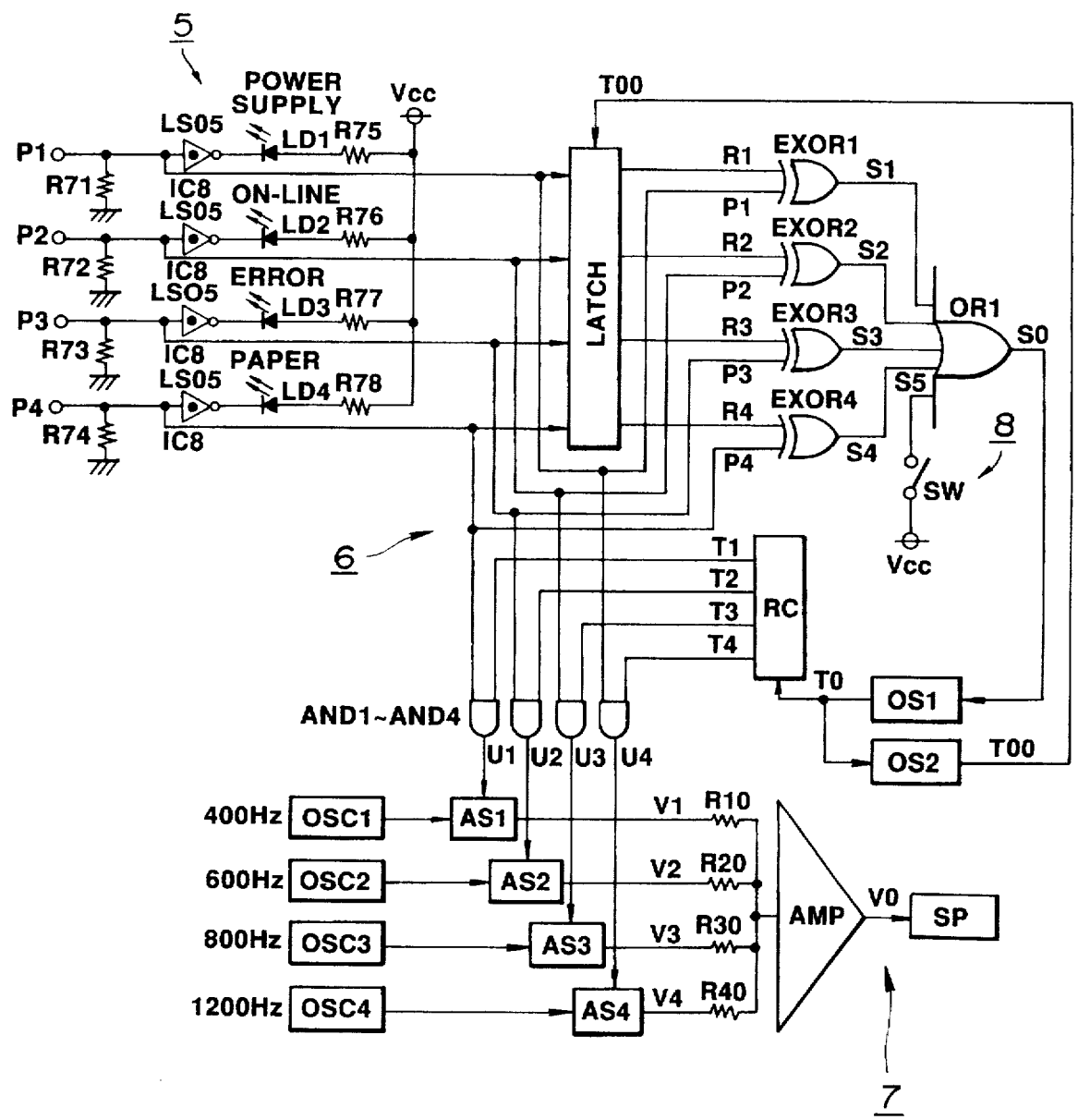
FIG. 7 is a diagram showing the detailed configuration of the circuitry of a principal part of the apparatus of the first embodiment.
Figure 8:
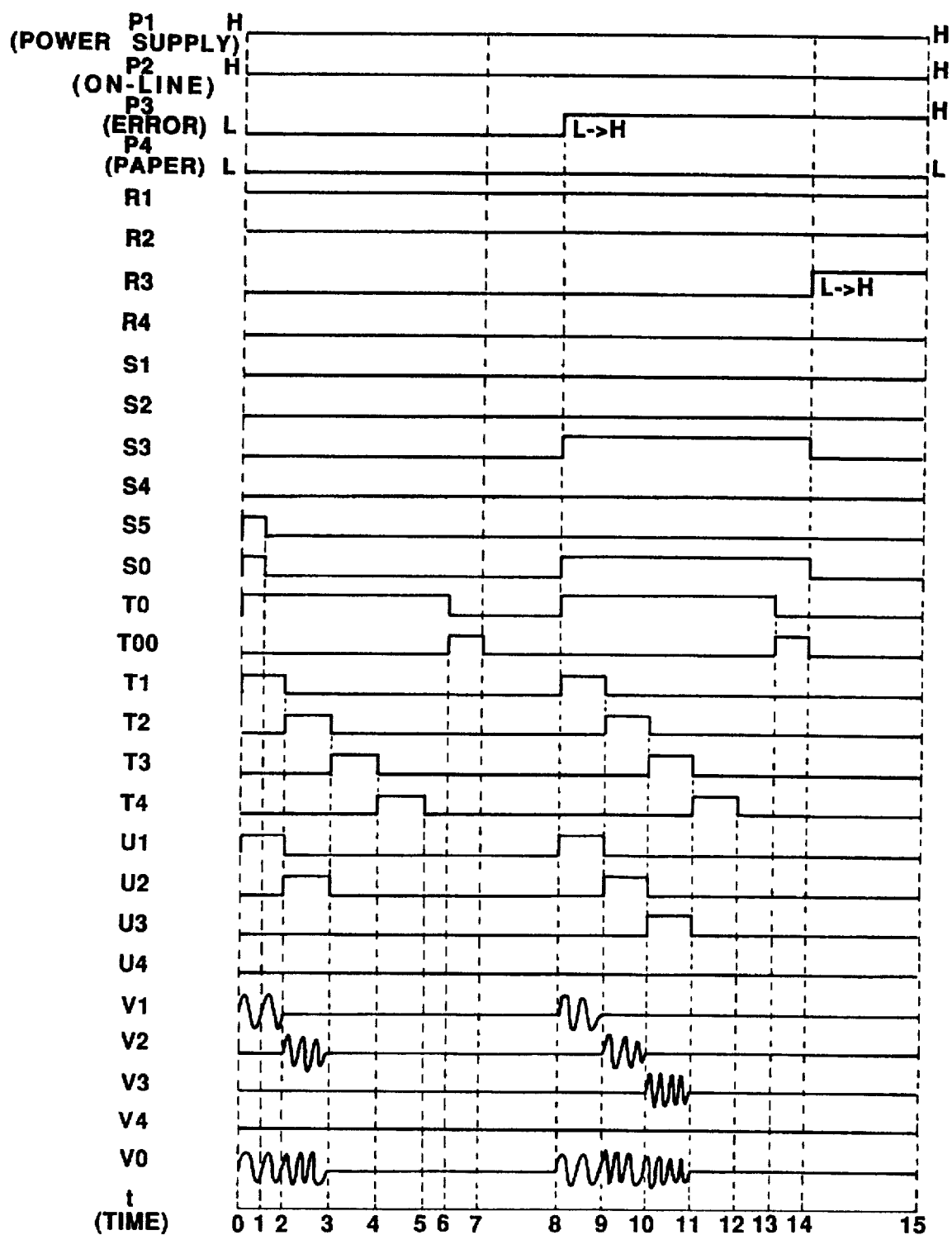
FIG. 8 is a timing chart showing respective timings for input and output signals of the circuitry shown in FIG. 7.

FIG. 7 shows the detailed configuration of the circuitry of a principal part of the apparatus shown in FIG. 6. FIG. 8 shows input and output timings for the circuitry. The operation of the present embodiment will now be described in detail with reference to FIGS. 7 and 8. In FIG. 7, inverter circuit elements IC8, LED's LD1–LD4 and the peripheral circuitry thereof are the same as those of the conventional apparatus shown in FIG. 3. Hence, a description thereof will be omitted. This portion corresponds to the first display output unit shown in FIG. 6. In FIG. 8, at time t0, display output signals P1–P4 assume H (high), H, L (low) and L levels, respectively, that is, power-supply indicator 29 is turned on, on-line indicator 30 is turned on, error indicator 37 is turned off, and paper indicator 36 is turned off (see FIG. 2).

The following description mainly relates to a portion corresponding to conversion device 6 shown in FIG. 6. Input signals P1–P4 to respective inverter circuit elements IC8 are outputted from first display output unit 5 and are input as input signals to latch circuit element LATCH of conversion device 6. Latch circuit element LATCH latches input signals in response to input signal T00 at times t7 and t14. Thus, the current display output signals P1–P4 and latched past display output signals R1–R4 are input to two-input exclusive OR circuit elements EXOR1–EXOR4. The outputs of elements EXOR1–EXOR4 are signals S1–S4, respectively, which are input into five-input OR circuit element OR1.

If any of two-input exclusive OR circuit elements EXOR1–EXOR4 assumes an H (high) level, or if input switch SW is switched on to provide a signal S5 input into circuit element OR1, the output signal SO of five-input OR circuit element OR1 assumes an H level. The input switch SW corresponds to the second input device 8 shown in FIG. 6.

Suppose that input switch SW is switched on at time t0. One-shot circuit element OS1 is thereby triggered to generate output signal T0. Ring counter circuit element RC starts to operate in response to receiving output signal T0. Output signals T1–T4 are sequentially output from ring counter circuit element RC. Output signals T1–T4 and the current display output signal P1–P4 are input into two-input AND circuit elements AND1–AND4, respectively. Specifically, signal P1 is input into AND4, signal P2 is input into AND3, signal P3 is input into AND2, and signal P4 is input into AND1. Output signals U1–U4 from two-input AND circuit elements AND1–AND4, respectively, develop the current display output signals at times t0–t5 to provide H, H, L and L levels, respectively. Specifically, U1 is at the H level between times t0 and t2 and then assumes the L level from times t2 to t7 in response to T1 assuming the L level. U2 is at the L level between times t0 and t2 and assumes the H level from times t2 to t3 and then again assumes the L level from times t3 to t8 in response to signal T2 assuming an H level from times t2 to t3. U3 remains at an L level from times t0 to t9, assumes an H level from times t10 to t11, and then returns to the L level in response to signal T3 assuming an H level from times t3 to t4 and from times t10 to t11. U4 remains at an L level from times t0 to t15. The output signals U1–U4 become input signals to analog switch circuit elements AS1–AS4, respectively, and control the output signals of audio-frequency oscillators OSC1–OSC4, respectively.

Oscillators OSC1, OSC2, OSC3 and OSC4 generate sine waves having frequencies of 400 Hz (hertz), 600 Hz, 800 Hz and 1200 Hz, respectively. The output signals V1–V4 of oscillators OSC1–OSC4, respectively, are generated via analog switch circuit elements AS1–AS4, respectively, only when the above-described output signals U1–U4 assume an H level. That is, in the case of FIG. 8, a 400-Hz sine wave is generated between times t0 and t2, and a 600-Hz sine wave is generated between times t2 and t3. The levels of output signals V1–V4 are adjusted by resistors R10–R40 for level adjustment, respectively, and the respective signals are amplified by amplifier AMP. The output signal V0 of amplifier AMP drives speaker SP. Thus, when input switch SW has been switched on, a sound having an audio frequency corresponding to the current display output signal P1–P4 for visual display is generated from speaker SP. This portion corresponds to second display output unit 7 shown in FIG. 6.

At time t6, output signal T0 assumes an L level. First one-shot circuit element OS1 operates between times t0 and t6. A second one-shot circuit element OS2 is triggered in response to signal T0 assuming an L level to generate its output signal T00. At time t7, output signal T00 assumes an L level. Second one-shot circuit element OS2 operates between times t6 and t7 (and later between times t13 and t14). The change of output signal T00 to an L level provides a latch input signal to latch circuit element LATCH. Latch circuit element LATCH then latches current display output signals P1–P4 as latch data R1–R4. At time t7, both signals P1–P4 and latch data R1–R4 assume the same level. Hence, the output signals S1–S4 of two-input exclusive OR circuit elements EXOR1–EXOR4 remain at the L level.

Suppose that at time t8, display output signal P3 changes from an L level (the error indicator is turned off) to an H level (the error indicator is turned on). At time t8, the output signal S3 of two-input exclusive OR circuit element EXOR3 changes to an H level. As at time t0, one-shot circuit element OS1 is thereby triggered to generate output signal T0. Ring counter circuit element RC starts to operate in response to receiving output signal T0. Output signals T1–T4 are then sequentially output from ring counter circuit element RC.

As when depressing input switch SW, the current display output signals P1–P4 are developed to assume H, H, H and L levels, respectively, between times t8 and t12. As between times t0 and t3, signals S1, S3, S4, and S5 assume or remain at the L level. In addition, signal T1 assumes the H level between times t8 and t9 and then returns to the L level, signal T2 assumes the H level between times t9 and t10 and then returns to the L level, signal T3 assumes the H level between times t10 and t11 and then returns to the L level, and signal T4 assumes the H level between times t11 and t12 and then returns to the L level. Consequently, signal U1 assumes the H level between times t8 and t9, signal U2 assumes the H level between times t9 and t10, and signal U3 assumes the H level between times t10 and t11. Signal U4 remains at the L level. As between times t0 and t3, between times t8 and t11, a 400-Hz sine wave, a 600-Hz sine wave and a 800-Hz sine wave are generated between times t8 and t9, t9 and t10, and t10 and t11, respectively, as amplifier output signal V0 between times t8 and t11. The output signal V0 drives speaker SP. Thus, if any visual display output changes, a sound having an audio frequency corresponding to the current display output signal P1–P4 is generated from speaker SP. According to the above-described operation, a display output which could be confirmed only by the visual sense is converted into a sound and is provided to the user. It is apparent that this information output in the form of a sound can be easily understood even by a visually-handicapped user.

Subsequently, at time t13, output signal T0 assumes an L level. One-shot circuit element OS2 is thereby triggered to generate its output signal T00 which is at an H level between times t13 and t14 and which thereafter assumes an L level. The change of output signal T00 to an L level at time t14 provides a latch input signal to latch circuit element LATCH. Latch circuit element LATCH latches current display signals P1–P4 as latch data R1–R4.

After time t14, both display signals P1–P4 and latch data R1–R4 assume the same level. Hence, the output signals S1–S4 of two-input exclusive OR circuit elements EXOR1–EXOR4 assume an L level. Accordingly, the output signal S0 of five-input OR circuit element OR1 assumes an L level, and second display output unit 7 assumes a standby state.

Modifications of the First Embodiment

1) Although in the above-described embodiment, audio-frequency oscillators OSC1–OSC4 are provided as separate units, a plurality of audio frequencies may be provided by dividing the output of a single audio-frequency oscillator. The configuration of a frequency divider will be simplified by selecting the oscillating frequency of the oscillator to be 2400 Hz which is the least common multiple of the frequencies of the above-described oscillators OSC1–OSC4.

2) Although in the above-described embodiment, the waves generated from audio-frequency oscillators OSC1–OSC4 are sine waves, the waves may be triangular waves, rectangular waves, or waves from a musical instrument.

3) Although in the above-described embodiment, the waves generated from audio-frequency oscillators OSC1–OSC4 are simple sine waves, the meaning of the output of the device will be more easily understood if a human voice speaking a recognizable language generated from a voice synthesis apparatus or a recording/reproducing apparatus is used. For example, voice messages, such as "the power supply is turned on", "an on-line mode is provided", "an error is produced" and "paper is exhausted", are preferred for the outputs of oscillators OSC1–OSC4, respectively.

4) Although in the above-described embodiment, the speaker generates a sound having an audio frequency, the meaning of the output of the device will be understood even by a hearing impaired user if the speaker is replaced by a piezoelectric vibrator or an electromagnetic vibrator. The user may, of course, directly touch a vibrating portion (for example, cone paper) of the speaker with his hand.

5) Although in the above-described embodiment, the speaker generates a sound having an audio frequency, a quieter environment will be provided if the speaker is replaced by an earphone. The size of an amplifier can thereby be reduced, causing a decrease in the amount of consumed energy.

Second Embodiment

Figure 9:
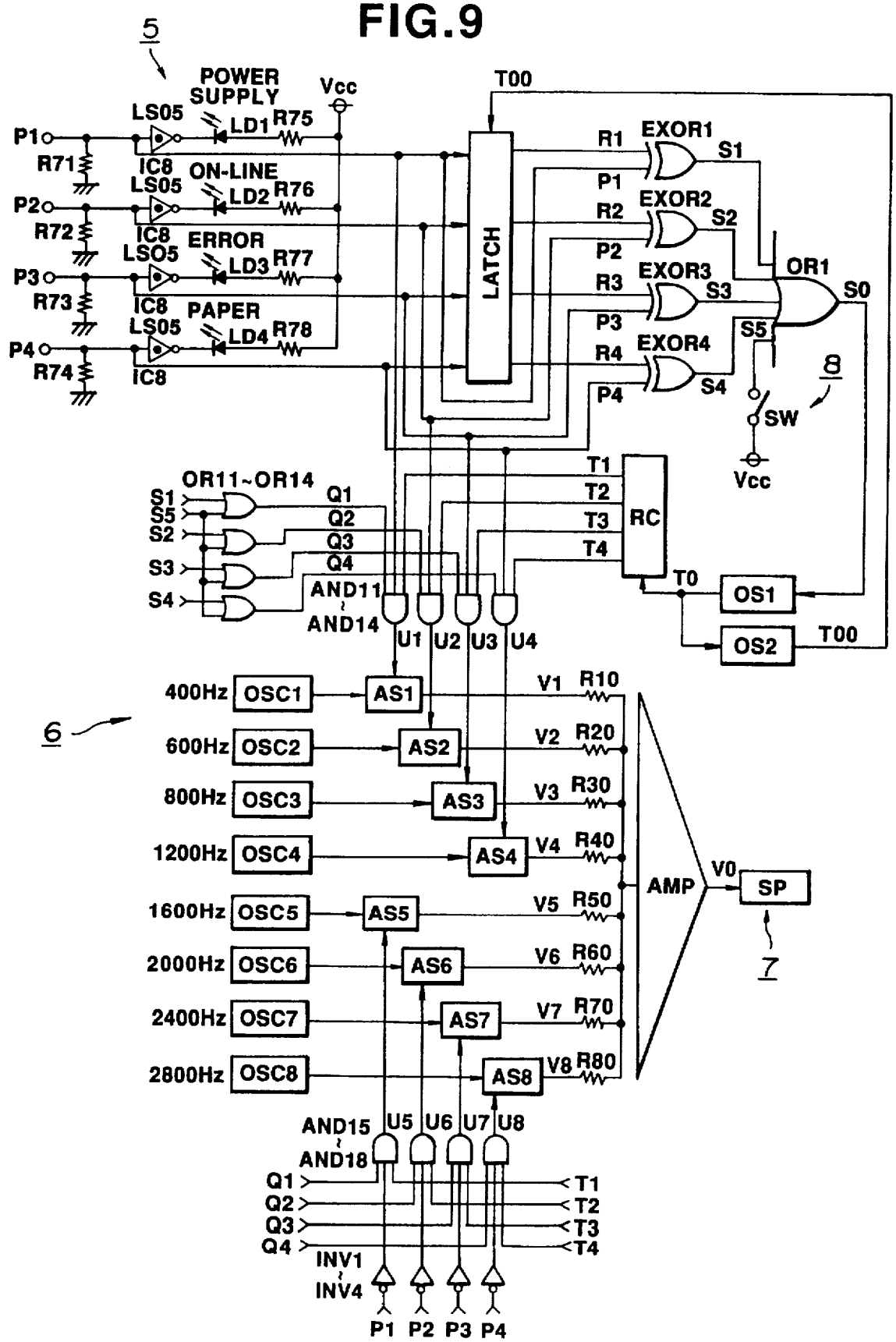
FIG. 9 is a diagram showing the detailed configuration of the circuitry of a principal part of an apparatus according to a second embodiment of the present invention.
Figure 10:
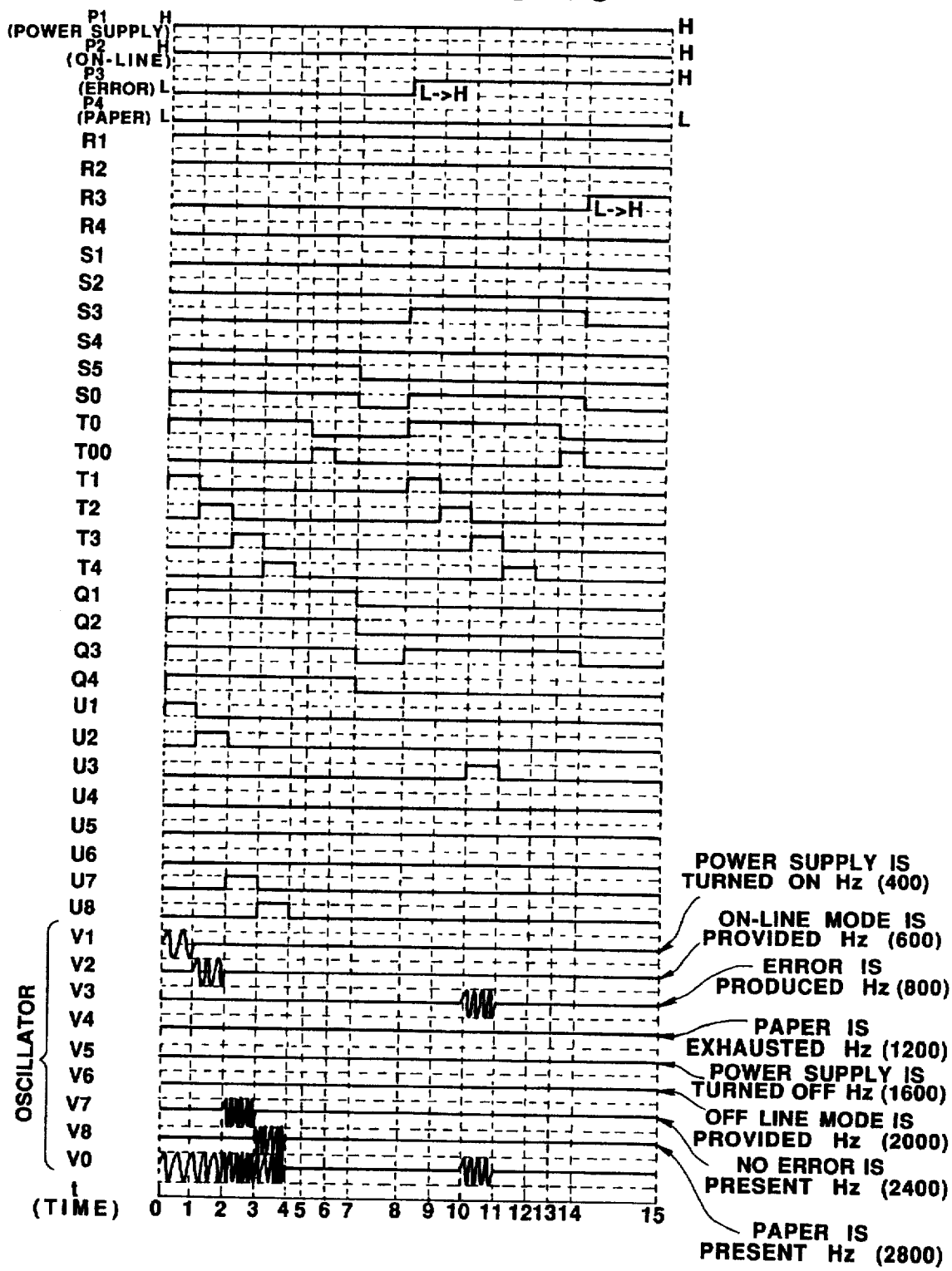
FIG. 10 is a timing chart showing respective timings for input and output signals of the circuitry shown in FIG. 9.

FIG. 9 is a circuit diagram illustrating a second embodiment of the present invention. FIG. 10 is a timing chart for the circuitry of the second embodiment. The operation of the circuitry of the present embodiment will be described with reference to FIGS. 9 and 10. A description will be omitted for portions of this embodiment which are the same as in the first embodiment. In the second embodiment elements that are the same as those used in the first embodiment are referred to by the same reference numerals and function in the same manner. As a result, signals P1–P4, R1–R4 and S1–S5 are the same as in the first embodiment.

Suppose that input switch SW is turned on at time t0. One-shot circuit element OS1 is thereby triggered to generate output signal T0. Ring counter circuit element RC starts to operate in response to receiving output signal T0. Output signals T1–T4 are sequentially output from ring counter circuit element RC. In addition, if input switch SW is turned on, the output signals Q1–Q4 of two-input OR circuit elements OR11–OR14 assume an H level from times t0 to t7. Thus, at time t0 signal T1 assumes the H level and then assumes the L level from times t1 to t7, signal T2 is at the L level from times t0 to t1, assumes the H level from times t1 to t2 and then assumes the L level from times t2 to t8, signal T3 is at the L level from times t0 to t2, assumes the H level from times t2 to t3, and again assumes the L level from times t3 to t9, and signal T4 is at the L level from times t0 to t3, assumes the H level from times t3 to t4, and assumes the L level from times t4 to t10.

Output signals T1–T4 of ring counter circuit element RC, the current display output signals P1–P4, and the output signals Q1–Q4 of two-input OR circuit elements OR11–OR14 are input to three-input AND circuit elements AND11–AND14, respectively.

Output signals T1–T4, the current display output signals P1–P4, and the output signals Q1–Q4 of two-input OR circuit elements OR11–OR14 are also input to three-input AND circuit elements AND15–AND18, respectively.

The output signals U1–U8 of three-input AND circuit elements AND11–AND18, respectively, develop the current display output signals between times t0 and t4, and assume (H, H, L, L) and (L, L, H, H) levels, respectively. Specifically, signal U1 is at the H level between times t0 and t1 and assumes the L level between times t1 to t15. Signal U2 is at the L level between times t0 and t1, assumes the H level between times t1 and t2, and assumes the L level between times t2 and t15. Signal U3 is at the L level between times t0 to t9, assumes the H level between times t10 and t11, and assumes the L level between times t11 and t15. Signals U4–U6 stay at the L level from times t0 to t15. Signal U7 assumes the L level from times t0 to t2, assumes the H level from times t2 to t3, and assumes the L level from times t3 to t15, and signal U8 assumes the L level from times t0 to t3, assumes the H level from times t3 and t4, and assumes the L level from times t4 to t15. The output signals U1–U8 become input signals to analog switch circuit elements AS1–AS8, respectively, and control the output signals of audio-frequency oscillators OSC1–OSC8, respectively.

The audio-frequency oscillators OSC1–OSC4 are in one group and are used when the corresponding display output signals U1–U4 assume an H level. The oscillators OSC1, OSC2, OSC3 and OSC4 generate sine waves having frequencies of 400 Hz, 600 Hz, 800 Hz and 1200 Hz, respectively.

The audio-frequency oscillators OSC5–OSC8 are in another group and are used when the corresponding display output signals U5–U8 assume an L level. The oscillators OSC5, OSC6, OSC7 and OSC8 generate sine waves having frequencies of 1600 Hz, 2000 Hz, 2400 Hz and 2800 Hz, respectively.

The output signals V1–V8 of analog switch circuits AS1–AS8, respectively, are generated only when signals U1–U8 assume an H level, respectively. That is, sine waves having frequencies of 400 Hz, 600 Hz, 2400 Hz and 2800 Hz are generated between times t0 and t1, t1 and t2, t2 and t3, and t3 and t4, respectively. Accordingly signals V1 and V0 have a 400 Hz frequency between times t0 and t1, signals V2 and V0 have a frequency of 600 Hz between times t1 and t2, signals V7 and V0 have a frequency of 2400 Hz between times t2 and t3, and signals V8 and V0 have a frequency of 2800 Hz between times t3 and t4. The levels of output signals V1–V8 are adjusted by resistors R10–R80, respectively, for level adjustment, and the respective signals are amplified by amplifier AMP. The output signal V0 of amplifier AMP drives speaker SP. Thus, when input switch SW has been turned on, a sound having an audio frequency corresponding to the current display output signals P1–P4 is generated from speaker SP.

Accordingly, in contrast to the first embodiment, in the present embodiment, the state of the current display output can be confirmed by a sound no matter when the current display output signal P1–P4 is turned on or off.

Suppose that at time t8, display output signal P3 changes from an L level (the error indicator is turned off) to an H level (the error indicator is turned on). At time t8, the output signal S3 of two-input exclusive OR circuit element EXOR3 assumes an H level until time t14. As at time t0, one-shot circuit element OS1 is thereby triggered to generate output signal T0 which assumes an H level from times t8 to t13. Ring counter circuit element RC starts to operate in response to receiving output signal T0. Output signals T1–T4 are sequentially output from ring counter circuit element RC. Thus, signal T1 assumes the H level between times t8 and t9 and then assumes an L level, signal T2 stays at the L level from times t8 to t9, assumes the H level from times t9 to t10, and again assumes the L level from times t10 to t15, signal T3 is at the L level from times t8 to t10, assumes the H level from times t10 to t11, and again assumes the L level from times t11 to t15, and signal T4 is at the L level from times t8 to t11, assumes the H level from times t11 to t12, and assumes the L level from times t12 to t15.

Subsequently, as when depressing input switch SW, the current display output signals are developed between times t8–t12. However, in contrast to when input switch SW is depressed, only output signal Q3 among the output signals Q1–Q4 of two-input OR circuit elements OR11–OR14 assumes an H level. The output signals U1–U8 of three-input AND cir-cuit elements AND11–AND18 thereby assumes (L, L, H, L) and (L, L, L, L) levels, respectively. Specifically, between times t8 and t10, signal U3 is at the L level, between times t10 and t11, signal U3 assumes the H level, and thereafter assumes the L level. Consequently signals V3 and V0 have a frequency of 800 Hz between times t10 and t11. In contrast to the case between times t0 and t4, only an 800-Hz sine wave is generated between times t10 and t11. That output signal V0 drives speaker SP. As described above, if any of the display outputs change, a sound having an audio frequency corresponding to the current display output signals P1–P4 is generated from speaker SP. According to the above-described operation, a display output which could be confirmed only with the visual sense is converted into a sound, and is provided to the user. Such a sound can be perceived and understood even by a visually-handicapped user.

At time t13, output T0 assumes an L level. Thereafter, second display output unit 7 assumes a standby state by the same procedure as in the first embodiment.

Modifications of the Second Embodiment

1) Although in the above-described embodiment, audio-frequency oscillators OSC1–OSC8 are provided as separate units, a plurality of audio frequencies may be provided by dividing the output of a single audio-frequency oscillator.

2) Although in the above-described embodiment, the waves generated from audio-frequency oscillators OSC1–OSC8 are sine waves, the waves may be triangular waves, rectangular waves, or waves from a musical instrument.

3) Although in the above-described embodiment, the waves generated from audio-frequency oscillators OSC1–OSC8 are sine waves, the meaning of the signals output by the device will be more easily understood if a human voice generated by a voice synthesis apparatus or a recording/reproducing apparatus is used. For example, voice messages, such as "the power supply is turned on", "an on-line mode is provided", "an error is produced", "paper is exhausted", "the power supply is turned off", "an off-line mode is provided", "no error is present", and "paper is present", are preferred for the outputs of oscillators OSC1–OSC8, respectively.

4) Although in the above-described embodiment, the speaker generates a sound having an audio frequency, the meaning of the signals output by the device will be understood even by a hearing impaired user if the speaker is replaced by a piezoelectric vibrator or an electromagnetic vibrator. The user may, of course, directly touch a vibrating portion (for example, cone paper) of the speaker with a hand.

5) Although in the above-described embodiment, the speaker generates a sound having an audio frequency, a quieter environment will be provided if the speaker is replaced by an earphone. The size of an amplifier can thereby be reduced, causing a decrease in the amount of consumed energy.

Third Embodiment

Figure 11:
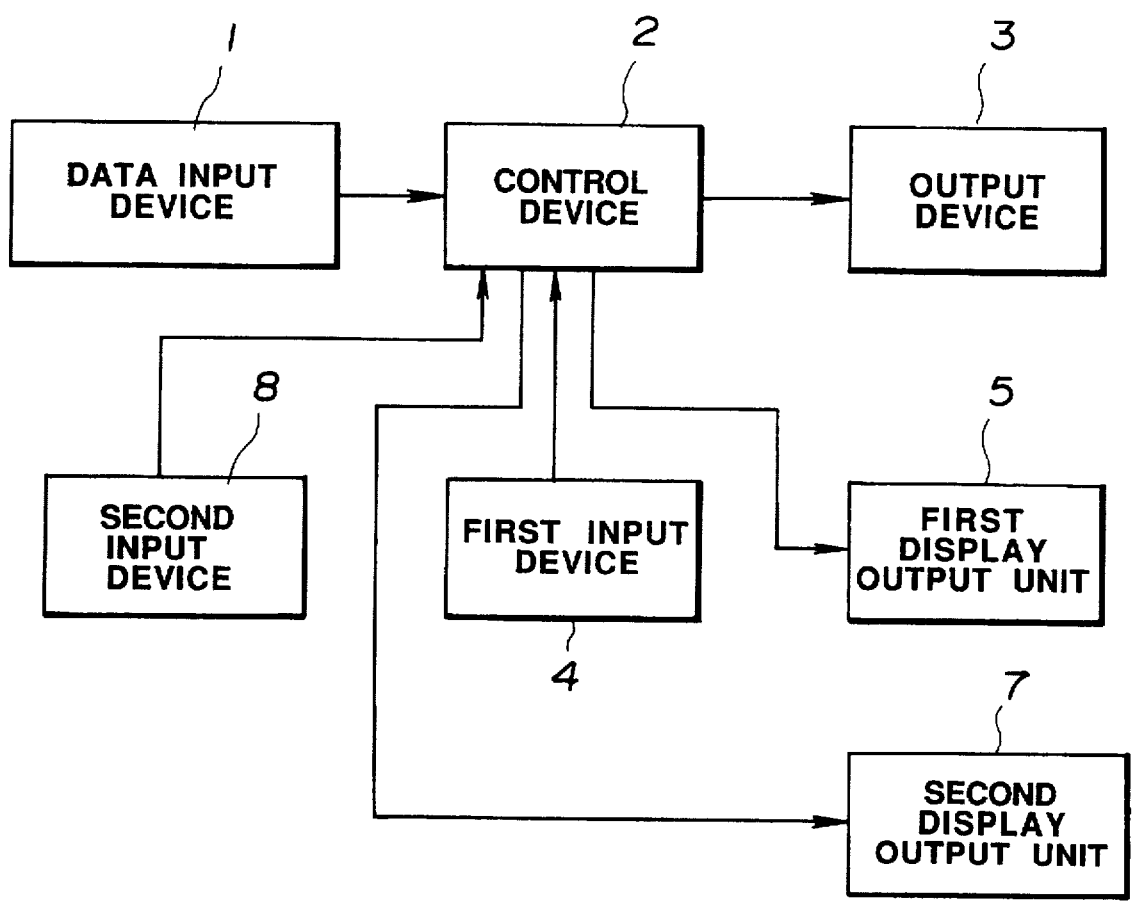
FIG. 11 is a block diagram showing the schematic configuration of the entire apparatus according to a third embodiment of the present invention.

FIG. 11 illustrates a schematic configuration of a third embodiment of the present invention. Devices and units indicated by the same reference numerals as those of the conventional apparatus shown in FIG. 1 have the same functions. Hence, a description thereof will be omitted. Conversion device 6 described in the first embodiment is integrated with control device 2. It is thereby possible to reduce the size of the entire apparatus and to improve the reliability of the apparatus. Since other devices and units are the same as those in the first embodiment, a description thereof will be omitted.

As described above, according to the present invention, the following effects can be obtained.

1) Visually-handicapped users can understand a display output converted into a sound or a voice using their auditory sense. As a result, they can fully participate in society irrespective of their physical handicap.

2) Physically-handicapped users who are visually and hearing impaired can understand a display output converted into vibrations with their tactile sense. As a result, they can participate in society irrespective of their combined physical handicap.

3) The above-described conversion operations are automatically performed when the original display output has changed. Hence, the user can always understand a change even while performing other kinds of jobs. Accordingly, physically-handicapped users as well as normal users can obtain information, such as information indicating the exhaustion of paper and the like, while performing other kinds of jobs.

4) Since the above-described conversion operations are performed when the original display output has changed, or by a command from the input device, a sound is generated only for a short time period, minimizing any disturbance of for the surroundings.

The individual components shown in outline or designated by blocks in FIGS. 1–7, 9, and 11 are all well-known in the information processing apparatus arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus for physically-handicapped users, said apparatus comprising:

control means for generating information on the operating state of said information processing apparatus;

input means for inputting information to said control means;

a first display output unit for displaying a plurality of information on the operating state of said information processing apparatus as visual display information;

said control means generating a plurality of kinds of output signals corresponding to each of the plurality of information to be displayed visually on said first display output unit;

conversion means for converting output signals generated by said control means to one of auditory display information adapted to be auditorily perceived by a visually impaired user and tactile display information adapted to be perceived using tactile perception by a hearing impaired user; and a second display output unit, for outputting the information converted by said conversion means as a sound, or vibration, comprising an electromechanically vibrated member.

2. An apparatus according to claim 1, wherein, when the contents of the visual display information change, said conversion means converts only the changed visual display information into one of auditory display information and tactile display information.

3. An apparatus according to claim 2, wherein, when the visual display information comprises lit information adapted to be visually perceived by whether a light is turned on or off, said conversion means converts the lit information into one of auditory display information and tactile display information.

4. An apparatus according to claim 3, further comprising instruction means for instructing the start and end of the conversion processing of said conversion means.

5. The apparatus according to claim 4, wherein the sound output from said second display output means comprises a voice message corresponding to the contents of the visual display information.

6. The apparatus according to claim 3, wherein the sound output from said second display output means comprises a voice message corresponding to the contents of the visual display information.

7. The apparatus according to claim 2, further comprising instruction means for instructing the start and end of the conversion processing of said conversion means.

8. The apparatus according to claim 7, wherein the sound output from said second display output means comprises a voice message corresponding to the contents of the visual display information.

9. The apparatus according to claim 2, wherein the sound output from said second display output means comprises a voice message corresponding to the contents of the visual display information.

10. The apparatus according to claim 1, wherein, when the visual display information comprises lit information adapted to be visually perceived by whether a light is turned on or off, said conversion means converts the lit information into one of auditory display information and tactile display information.

11. The apparatus according to claim 10, further comprising instruction means for instructing the start and end of the conversion processing of said conversion means.

12. The apparatus according to claim 11, wherein the sound output from said second display output means comprises a voice message corresponding to the contents of the visual display information.

13. The apparatus according to claim 1, wherein the sound output from said second display output means comprises a voice message corresponding to the contents of the visual display information.

14. The apparatus according to claim 1, further comprising instruction means for instructing the start and end of the conversion processing of said conversion means.

15. The apparatus according to claim 14, wherein the sound output from said second display output means comprises a voice message corresponding to the contents of the visual display information.

16. An apparatus for processing information, said apparatus comprising:

control means for generating a plurality of information relating to the functioning of the apparatus;

input means for inputting information to said control means;

display means, connected to said generating means, for displaying a plurality of information relating to the functioning of said apparatus generated by said generating means;

said control means generating a plurality of kinds of output signals corresponding to each of the plurality of information to be displayed by said display means;

conversion means for converting output signals generated by said control means to a sound or vibration; and output means, connected to said control means, for outputting the information displayed by said display means with the sound or the vibration converted by said conversion means, comprising an electromechanically vibrated member.

17. An apparatus according to claim 16, wherein said display means comprises mode display means for displaying information on the operating mode of said apparatus.

18. An apparatus according to claim 16, wherein the information generated by said control means is supplied to said output means for generating vibrations.

19. An electronic apparatus for processing information, said apparatus comprising:

display means for displaying information relating to the functioning of said apparatus;

control means for generating output signals corresponding to the kinds of information to be displayed by said display means;

input means for inputting information to said control means;

conversion means for converting output signals generated by said control means to different sounds or vibrations, respectively, in accordance with the kinds of information to be displayed by said display means;

output means, comprising an electromechanically vibrated member, for outputting information displayed by said display means with the sound or the vibration converted by said conversion means; and instruction means for instructing said output means to output the information displayed by said display means.

20. An apparatus according to claim 19, wherein said display means comprises mode display means for displaying information on the operating mode of said apparatus.

21. An electronic apparatus for processing information, said apparatus comprising:

generating means for generating information relating to the functioning of said apparatus;

input means for inputting information to said generating means;

display means for displaying the information generated by said generating means;

conversion means for converting information to be displayed on said display means to an output signal of a ring counter;

control means for controlling the output signal of a frequency oscillator on the basis of information to be displayed on said display means and the output signal of said ring counter;

an amplifier for amplifying the output signal of the frequency oscillator controlled by said control means;

said conversion means converting the output signal amplified by said amplifier to a sound or vibration;

output means, comprising an electromechanically vibrated member, for outputting the information displayed by said display means with the sound or the vibration converted by said second conversion means; and instruction means for instructing said output means to output the information displayed by said display means.

22. An apparatus according to claim 21, wherein said display means comprises mode display means for displaying information on the operating mode of said apparatus.

23. An electronic apparatus for processing information, said apparatus comprising:

generating means for generating mode information relating to the functioning of said apparatus and output signals corresponding to the kinds of mode information;

input means for inputting information to said generating means;

display means for displaying the mode information generated by said generating means;

conversion means for converting the output signals generated by said generating means to a sound or vibration corresponding to the kinds of the mode information;

output means, comprising an electromechanically vibrated member, for outputting the output signals corresponding to the kind of mode information displayed by said display means with the sound or the vibration converted by conversion means; and instruction means for instructing said output means to output the output signals corresponding to the kind of mode information displayed by said display means.

* * * * *

UNITED STATES PATENT AND TRADEMARK OFFICE
CERTIFICATE OF CORRECTION

PATENT NO.  : 5,588,839          Page  1  of  3
DATED       : December 31, 1996
INVENTOR(S) : ISAMU SHIMODA It is certified that error appears in the above-indentified patent and that said Letters Patent is hereby corrected as shown below:

ON THE COVER PAGE:

[56] References Cited:

U.S. PATENT DOCUMENTS:

After "4,881,900 11/1989 Matsuoka et al.", insert:  --5,182,583 1/1993 Horigome et al.--.

[57] ABSTRACT:

Line 3, "be" should read --to be--.

UNITED STATES PATENT AND TRADEMARK OFFICE
CERTIFICATE OF CORRECTION

PATENT NO. : 5,588,839            Page  2  of  3

DATED : December 31, 1996

INVENTOR(S) : ISAMU SHIMODA

It is certified that error appears in the above-indentified patent and that said Letters Patent is hereby corrected as shown below:

COLUMN 3:

Line 42, "a" should be deleted.

COLUMN 4:

Line 27, "play" should read --delete Col. 4, lines 27-59, from "play means for ...... the display means." (per examiner)

COLUMN 9:

Line 42, "Accordingly" should read --Accordingly,--.

UNITED STATES PATENT AND TRADEMARK OFFICE
CERTIFICATE OF CORRECTION

PATENT NO. : 5,588,839
DATED : December 31, 1996
INVENTOR(S) : ISAMU SHIMODA

It is certified that error appears in the above-indentified patent and that said Letters Patent is hereby corrected as shown below:

COLUMN 10:

Line 17, "cir-cuit" should read --circuit--.

Line 21, "Consequently" should read --Consequently,--.

Signed and Sealed this

Twenty-second Day of July, 1997

Attest:

BRUCE LEHMAN

Attesting Officer

Commissioner of Patents and Trademarks